United States Patent
Sekine et al.

(10) Patent No.: US 6,773,767 B2
(45) Date of Patent: Aug. 10, 2004

(54) LIQUID CRYSTAL DISPLAY UNIT AND METHOD FOR MANUFACTURING THE SAME

(75) Inventors: Hiroyuki Sekine, Tokyo (JP); Fujio Okumura, Tokyo (JP); Shigeyuki Iwasa, Tokyo (JP)

(73) Assignee: NEC Corporation (JP)

( * ) Notice: Subject to any disclaimer, the term of this patent is extended or adjusted under 35 U.S.C. 154(b) by 270 days.

(21) Appl. No.: 09/801,354

(22) Filed: Mar. 7, 2001

(65) Prior Publication Data

US 2003/0207049 A1 Nov. 6, 2003

(30) Foreign Application Priority Data

Mar. 7, 2000 (JP) ........................................ 2000-062284

(51) Int. Cl.[7] ........................ G02F 1/136; G02F 1/1333
(52) U.S. Cl. ...................... 428/1.5; 428/1.53; 428/1.54; 428/480; 430/285.1; 427/160; 525/332.1; 526/281; 526/308; 526/309; 526/329.7
(58) Field of Search ................................ 428/1.5, 1.53, 428/1.54, 1.55, 441, 442, 480, 482, 483, 1.33; 430/285.1, 286.1, 287.1, 910; 427/160; 526/281, 308, 309, 329.7; 525/332.1

(56) References Cited

U.S. PATENT DOCUMENTS 5,818,550 A * 10/1998 Kadota et al. ................ 349/43
5,859,683 A    1/1999 Tagusa et al. .............. 349/138
5,907,376 A    5/1999 Shimada et al. ............... 349/42
6,069,678 A *  5/2000 Sakamoto et al. .......... 349/141
6,248,499 B1 * 6/2001 Maeda et al. ............. 430/270.1

FOREIGN PATENT DOCUMENTS

| JP | 9-096837 | 4/1997 | ........... G02F/1/136 |
| JP | 9-281524 | 10/1997 | ........... G02F/1/135 |
| JP | 10-90669 | 4/1998 | ......... G02F/1/1333 |
| KR | 1997-0071098 | 11/1997 | ........... G02F/1/136 |

* cited by examiner

*Primary Examiner*—Harold Pyon
*Assistant Examiner*—Sow-Fun Hon
(74) *Attorney, Agent, or Firm*—Hayes Soloway P.C.

(57) ABSTRACT

To provide a liquid crystal display unit without occurrence of abnormal orientation of liquid crystal molecules and deterioration of the image quality and a method for manufacturing the same. Above and below a TFT, light shielding films are disposed and further the ruggedness generated by stacking a plurality of light shielding films is smoothed using a transparent resin not absorbing light with a wavelength of not smaller than 300 nm. As this transparent resin, acrylic resins are used. As a result, according to the present invention, no abnormal orientation of liquid crystal molecules occurs and a problem of reverse twist, reverse tilt or the like is less probable to take place. Since the smoothening film absorbs no light of not smaller than 300 nm, neither denaturalization nor coloration nor bubbles occur in the smoothening film even under irradiating environments of intense light of a projector or the like.

4 Claims, 2 Drawing Sheets

LIQUID CRYSTAL DISPLAY UNIT AND METHOD FOR MANUFACTURING THE SAME

BACKGROUND OF THE INVENTION

1. Field of the Invention

The present invention relates to a liquid crystal display unit and a method for manufacturing the same, in particular to a smoothening film without occurrence of abnormal orientation of liquid crystal molecules and a method for manufacturing the same.

2. Description of the Prior Art

For the downsizing of a liquid crystal projector, it is advantageous to use a poly-silicon thin film transistor (Poly-Si TFT) as an active element of a liquid crystal panel. This is because the poly-Si TFT can provide sufficient characteristics even with a TFT element smaller size and further a peripheral drive circuit can also be integrated in the liquid crystal panel.

The performances required for a liquid crystal projector include the size and the luminosity of a project screen. To enlarge the project screen and further raise the luminosity, it is necessary to irradiate an intense light on the liquid crystal panel. When light is irradiated on poly-Si TFT elements disposed in individual pixels of the liquid crystal panel, however, an optical leakage current is generated and the voltage applied to each pixel fluctuates. As a result, the image quality significantly deteriorates. Besides, not only light irradiated to the liquid crystal panel from the light source but reflected light generated in the process of transmission through an optical system such as lenses after the transmission through the liquid crystal panel also produces an optical leakage current similarly, thereby deteriorating the image quality significantly.

Accordingly, to protect the TFT from these rays bringing about optical leakage currents, there is often used such a structure that the top and the bottom of a TFT are covered with a metal film (referred to as light shielding film) so as to prevent light from hitting on the TFT.

FIG. 1 is a sectional view of the TFT part whose top and bottom are covered with a metal film in a conventional liquid crystal display unit. This conventional liquid crystal display unit comprises a substrate with a TFT of an active element formed thereon (referred to a TFT substrate 3), a substrate with a common electrode formed thereon (referred to as opposite substrates 4) and a liquid crystal layer 615 packed between these substrates.

The TFT substrate 3 with a transparent substrate 600 made of glass or the like employed as the base substrate, comprises a lower light shielding film 601, an underlying film of insulating nature 602, a poly-Si film 619, a gate insulating film 605 made of $SiO_2$ or the like and a gate electrode 606 formed in sequence on this substrate 600. Furthermore, the TFT substrate 3 comprises the first inter-layer insulating film 607, a wiring metal film 608, the second inter-layer insulating film 609, an upper light shielding film 610, the third inter-layer insulating film 611, a transparent electrode 613 in use for pixel electrodes, made of an ITO film (Indium Tin Oxide film), and an alignment layer 614 made of a polyimide resin or the like formed in sequence on the gate insulating film 605.

Into part of the poly-Si film 619, impurities are injected to form a drain region 603 and a source region 604 and the intersection part of these poly-Si film 619 and gate electrode 606 serves as a TFT.

On the other hand, the opposite substrate 4 with a transparent substrate 618 made of glass or the like employed as the base substrate, comprises a transparent electrode 617 in use for the common electrode, made of an ITO film (Indium Tin Oxide film), and an alignment layer 616 made of a polyimide resin or the like formed in sequence on this base substrate.

In order to solve a problem of light leakage current, the TFT substrate 3 shown in FIG. 1 comprises numerous layers as mentioned above. On the surface of the alignment layer 614 at the top of the TFT substrate 3, a ruggedness is generated depending on the patterning of the lower layer. The step difference due to this ruggedness may amount to 1 $\mu$m or more and is a negligible value relative to the thickness (3 to 5 $\mu$m) of the liquid crystal layer. Thereby, a disorder in the orientation condition of liquid crystal molecules called reverse tilt or reverse twist occurs, thus deteriorating the display image quality significantly.

To solve this problem, means for forming a coat film of an organic or inorganic material below the transparent electrode of a TFT substrate to smooth the ruggedness is effective. In Japanese Patent Application Laid-Open No. 10-90669, an example of using a photosensitive acrylic resin is disclosed as a film of performing this smoothening (hereinafter, referred to as smoothening film).

Here, it is regarded as preferable to use an acrylic resin transparent to visible light as a base polymer, such as epoxy acrylate or urethane acrylate. As such an acrylic resin, a negative- or positive-type acrylic resin with a photosensitive group absorbing UV rays, of a wavelength not greater than 380 nm, is used so as to prevent the smoothening film from being discolored under action of visible light and keep the transmittance of the panel from lowering.

In the technique of the above publication, the photosensitive group remaining after the formation of a contact hole in the smoothening film of an acrylic resin is allowed to be decomposed under action of a high energy UV ray, but is difficult to completely decompose.

On the other hand, a high luminance light source has been used to improve the screen luminance of a projector and UV rays of 300 to 380 nm wavelength, contained in the irradiated light of a high luminance light source, to be originally cut off before entering a liquid crystal panel transmit through the filter even in a small amount to reach the liquid crystal panel. For this reason, according to the technique of the above publication, the photosensitive group left not completely decomposed in the smoothening film made of a photosensitive acrylic resin absorbs the UV rays of 300 to 380 nm wavelength leaking and reaching the liquid crystal panel. As a result, there were problems that the smoothening film was discolored and bubbles were generated in the smoothening film to reduce its transmittance in the visible light range. Beside, the technique of the above publication had fear of deterioration of the smoothening film (acrylic resin) itself under action of high energy UV rays to be used for the decomposition of the residual photosensitive group.

SUMMARY OF THE INVENTION

Hence, it is an object of the present invention to provide a liquid crystal display unit used for a liquid crystal projector and having a smoothening film without occurrence of an abnormal orientation of liquid crystal molecules and deterioration of the image quality as well as a method for manufacturing the same.

With the present invention, light shielding films are disposed at least on one side above and below the TFT of a TFT substrate and a transparent acrylic resin not absorbing ray of not smaller than 300 nm wavelength, formed by the thermal polymerization, is used to form a smoothening film below the transparent electrode of the TFT substrate. With the present invention, this structure prevents the smoothening film from being denaturalized or discolored even under action of the UV rays of not smaller than 300 nm wavelength of an intense light source such as projector, leaking from a filter. Besides, since a smoothening film is formed by the thermal polymerization, no photosensitive group absorbing a ray of not smaller than 300 nm wavelength is also present in the smoothening film. Accordingly, there is no need for irradiation treatment using a high energy UV ray after the film formation unlike the prior art and the smoothening film is not damaged by a high energy UV ray to generate bubbles.

Besides, with the present invention, a ray is incident to a TFT so as not to deteriorate the image quality and further the ruggedness generated by stacking a plurality of light shielding films is moderated by the smoothening film and no abnormal orientation of liquid crystal molecules occurs. Thereby, occurrence of a reverse twist or reverse tilt is prevented.

BRIEF DESCRIPTION OF THE DRAWINGS

This above-mentioned and other objects, features and advantages of this invention will become more apparent by reference to the following detailed description of the invention taken in conjunction with the accompanying drawings, wherein.

DETAILED DESCRIPTION OF THE PREFERRED EMBODIMENTS

Figure 1:
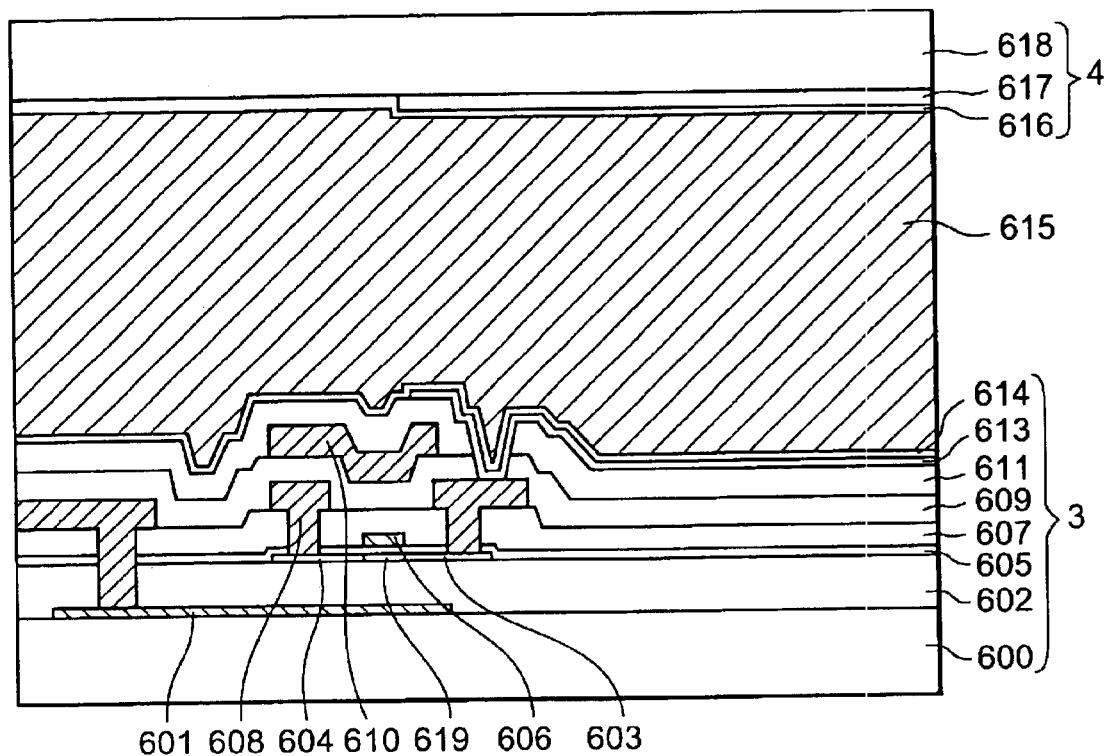
FIG. 1 is a sectional view of the TFT part of a conventional liquid crystal display unit.
Figure 2:
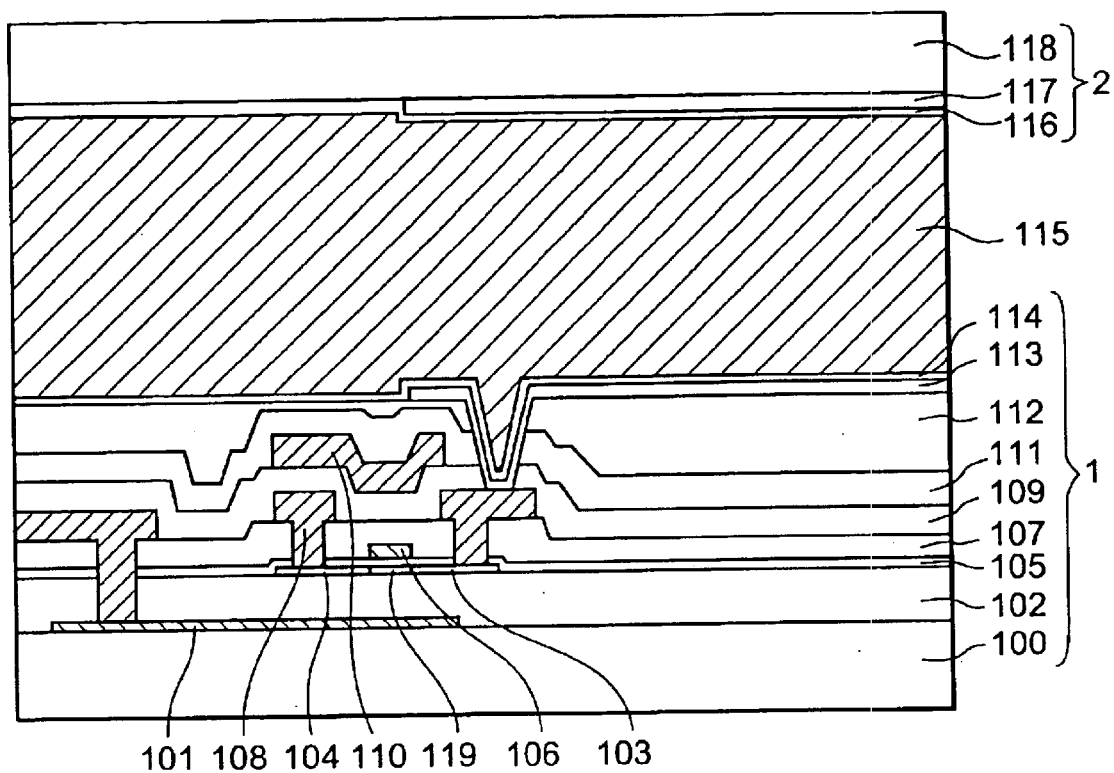
FIG. 2 is a sectional view of the TFT part of a liquid crystal display unit according to the present invention.

Referring to FIG. 2, a representative example of a liquid crystal display unit according to the present invention will be described. A liquid crystal display unit according to the present invention comprises a substrate on which a TFT as an active element is formed (referred to as TFT substrate 1), a substrate on which a common electrode is formed (referred to as opposite substrate 2) and a liquid crystal layer 115 formed by packing between these substrates.

The TFT substrate 1 with a transparent substrate 100 made of glass or the like employed as the base substrate, comprises a lower light shielding film 101, an underlying film 102 of insulating nature, a poly-Si film 119, a gate insulating film 105 and a gate electrode 106 formed sequentially on this substrate 100.

Furthermore, the TFT substrate 1 comprises a first inter-layer insulating film 107, a wiring metal film 108, a second inter-layer insulating film 109, an upper light shielding film 110 and a third inter-layer insulating film 111 formed in sequence on the gate insulating film 105 including the gate electrode 106. On the third inter-layer insulating film 111, an insulating film for smoothening the surface of the third inter-layer insulating film 111 (referred to as smoothening film 112), a transparent electrode 113 in use for pixel electrodes and an alignment layer 114 are formed in sequence and the TFT substrate 1 comprises all of these layers.

Into part of the poly-Si film 119, impurities are injected to form a drain region 103 and a source region 104 and the intersection part of this poly-Si film 119 and gate electrode 106 serves as a TFT.

On the other hand, the opposite substrate 2 with a transparent substrate 118 made of glass or the like employed as the base substrate, comprises a transparent electrode 117 in use for the common electrode and an alignment layer 116 formed in sequence on this substrate.

As a material of the transparent electrodes 113 and 117, an ITO film (Indium Tin Oxide film) is used and formed by the sputtering or the like.

The lower light shielding film 101 serves to prevent the light incident from the side of the transparent substrate 100 from being irradiated to a TFT, while materials durable for a high temperature process including high melting point metals such as W, WSi, Ti, Ta and Mo or alloys of these metals are used as its materials. When WSi is used as the lower light shielding film 101, for example, the film is formed to a thickness of 100 nm or more by the sputtering process or the like.

The underlying film 102 serves to prevent the poly-Si film 119 from being polluted by impurities derived from the transparent substrate 100 or the lower light shielding film 101 and is formed to a thickness of 200 nm or more by using $SiO_2$ as its material by the CVD process or the like.

The drain region 103 and the source region 104 are formed by the ion injection of phosphorus (P) for an N-type TFT or boron (B) for a P-type TFT on the poly-Si film. The poly-Si film can be formed by the pressure reduction CVD process or by the heat or laser melting and recrystallization of an amorphous Si film and is formed usually to a thickness of 50 to 100 nm.

Using a $SiO_2$ film or SiN film, the gate insulating film 105 is formed to a thickness of 50 nm or more by the CVD process or the like. For the gate electrode 106, WSi, poly-Si, Al or the like can be used. When WSi is used, for example, the film is formed to a thickness of 100 nm or more by the sputtering process or the like and the electrode is formed by the patterning.

By the poly-Si film 119, the gate insulating film 105 and the gate metal film 106, a TFT or an accumulation capacitance is determined.

Each of the first inter-layer insulating film 107, the second inter-layer insulating film 109 and the third inter-layer insulating film 111 is constructed of an insulating film of $SiO_2$, SiN or the like and usually formed to a thickness of 200 nm or more by the CVD process.

The wiring metal film 108 is a wiring for delivering a picture signal to pixels, formed using Al or an Al alloy as its material by the sputtering or the like and patterned. The upper light shielding film 110, serving to prevent light from entering the TFT from the side of the liquid crystal layer 115, is made using a metal film of Al, Cr or the like formed by the sputtering or the like. In case of using Al, for example, the film is formed to a thickness of 200 nm or more by the sputtering. Incidentally, the upper light shielding film 110 can be omitted.

The transparent electrode 113 serves to apply a voltage to the liquid crystal layer 115. In FIG. 2, a hole opened from the surface of the smoothening film 112 through the second inter-layer insulating film 109 and the third inter-layer insulating film 111 down to the surface of the wiring metal film 108 is formed by the dry etching process. On this hole, a conductive film equal in material to the transparent electrode 113 is formed. The transparent electrode 113 is connected to the drain region 103 of a TFT via the conductive film of the hole and the wiring metal film 108. By the way, the transparent film 113 may be connected directly to the drain region 103, not via the wiring metal film 108.

The alignment layer 114 and the alignment layer 116 are films for orienting liquid crystal molecules in a given direction and are formed using an organic insulating resin such as polyimide resin usually to a thickness of about 100 nm by the transcription printing process or spin coat process.

The smoothening film 112 is a film for smoothening the ruggedness generated on the surface of the third inter-layer film 111. As materials of the smoothening film 112, a transparent resin not absorbing light with a wavelength of 300 nm or higher is used. Light with a wavelength of 300 nm or higher passes through the smoothening film 112 resin without being absorbed. As this resin, an acrylic resin is used and coated on the third inter-layer film 111 by the spin coat process to form a smoothening film. Incidentally, the smoothening film 112 is formed to a thickness of 2 to 4 μm.

As an acrylic resin, a polymer having the repetitive unit represented by the following formula (1) or (2) or acetoxy tetracyclo[$4.4.0.1^{2,5}.1^{7,10}$]dodecyl acrylate-3,4-epoxytricyclo[$5.2.1.0^{2,6}$]decyl acrylate represented by the formula (3) or poly(acetoxy tetracyclo[$4.4.0.1^{2,5}.1^{7,10}$] dodecyl acrylate-2-epoxy norbornyl acrylate) material represented by the formula (4) is used to form a film.

(1)

where in the formula (1), $R^1$ represents a hydrogen atom or a methyl group, $R^2$ represents an alkylene group with a bridged cyclic hydrocarbon group, and $R^3$ represents a hydrogen atom or an alkyl group.

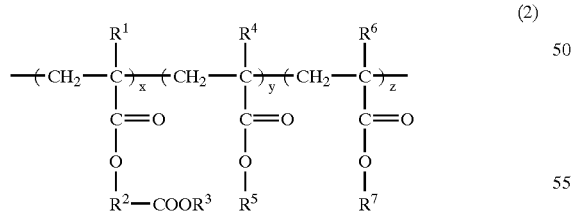

(2)

where in the general formula (2), $R^1$, $R^4$ and $R^6$ represent a hydrogen atom or a methyl group, $R^2$ represents an alkylene group with a bridged cyclic hydrocarbon group, $R^3$ represents a hydrogen atom or an alkyl group, $R^5$ represents an alkyl group with an group and, $R^8$ represents a hydrogen atom or an alkyl group x+y+z=1, $0<x\leq1$, $0\leq y<1$, $0\leq z<1$ and the polymerization average molecular weight of a polymer is 500 to 500,00.

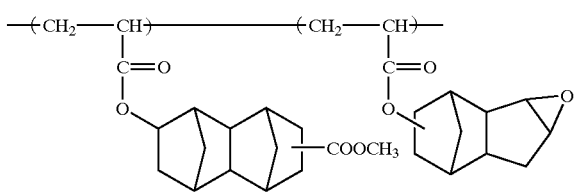

(3)

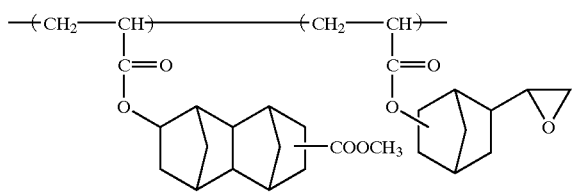

(4)

After applying a solution of a material represented by the above formulae (1) to (4) and a heat latent catalyst generating an acid on heating dissolved in an organic solvent onto the third inter-layer insulating film 111 by the spin coating process or the like, the smoothening film 112 is formed by the thermal polymerization. The thermal polymerization temperature is appropriately 120° C. or more and well preferably 150° C. or more. As organic solvents, toluene, xylene, ethyl acetate, butyl acetate, propylene glycol monomethylether acetate and the like are mentioned, but the solvents are not limited to these.

As heat latent catalysts, for example, 2-oxocyclohexyl methyl (2-norbornyl) sulfonium trifluorate represented by the following formula (5), cyclohexylmethyl (2-oxocyclohexyl)sulfonium trifluorate represented by the formula (6) and the like can be used.

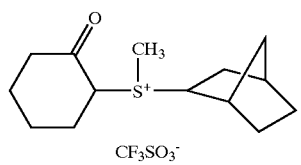

(5)

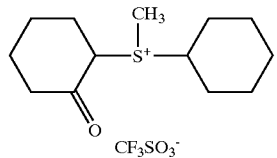

(6)

The added amount of a heat latent catalyst is not especially limited, but is appropriately 0.5 to 5 parts by weight relative to 100 parts by weight of a resin.

In the present invention, light shielding films are disposed on at least one side above and below the TFT of a TFT substrate and a transparent acrylic resin not absorbing light of not smaller than 300 nm wavelength formed below the transparent electrode of the TFT substrate by thermal polymerization is used to form a smoothening film. In the present invention, this structure prevents the smoothening film from being denaturalized or colored under action of the UV ray of not smaller than 300 nm wavelength, leaking from a filter, emitted from an intense light source such as a projector. Besides, since the smoothening film is formed by thermal polymerization, no photosensitive group absorbing light of not smaller than 300 nm wavelength is present in the smoothening film. Accordingly, after the film formation, there is no need for irradiation treatment by a high energy UV ray unlike the prior art and the smoothening film is not damaged by a high energy UV ray to generate bubbles.

Besides, in the present invention, light is incident to a TFT without deterioration of the image quality and further the ruggedness generated by stacking a plurality of light shielding films is moderated by using the smoothening film so as not to cause an abnormal orientation of liquid crystal molecules. Thereby, a problem of reverse twist, reverse tilt or the like is less probable to occur.

Hereinafter, with respect to embodiments, the present invention will be further specifically described.

(First Embodiment)

A liquid crystal display unit similar to that of FIG. 2 was manufactured. As the smoothening film of a TFT substrate, however, the material represented by the formula (7), was used for that represented by the formula (1) and a solution comprising this and a heat latent catalyst of 2-oxocyclohexylmethyl (2-norbornyl)sulfonium trifluorate represented by the above formula (5) dissolved in propylene glycol monomethylether acetate was prepared. This solution was rotationally applied to the surface of the third inter-layer film on the first substrate and thermally polymerized at 150° C. or higher to form a transparent approx. 3 μm thick smoothening film made of acrylic resin.

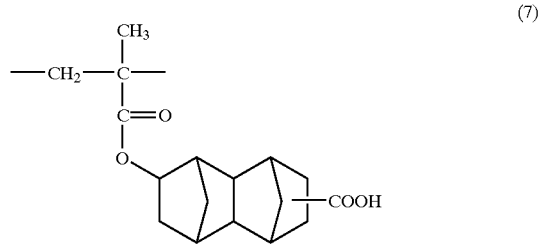

(7)

Since light shielding films were disposed above and below the TFT, light was incident to the TFT without deterioration of the image quality. Furthermore, the ruggedness generated by stacking a plurality of light shielding films was moderated by using the smoothening film so as not to cause an orientation abnormality of liquid crystal molecules. Thereby, a problem of reverse twist, reverse tilt or the like was less probable to occur. Besides, since the smoothening film was prepared using an acrylic resin not absorbing UV rays of not smallar than 300 nm wavelength, neither denaturalization nor coloration nor bubbles occurred in the smoothening film even under irradiating environments of intense light of a projector or the like.

(Second Embodiment)

A liquid crystal display unit similar to that of First Embodiment was manufactured. As the smoothening film of a TFT substrate, however, a solution comprising the material represented by the formula (7) of First Embodiment and a heat latent catalyst of cyclohexylmethyl (2-oxocyclohexyl) sulfonium trifluorate represented by the formula (6) dissolved in propylene glycol monomethylether acetate was prepared. This solution was rotationally applied to the surface of the third inter-layer film on the first substrate and thermally polymerized at 150° C. or higher to form a transparent approx. 3 μm thick smoothening film made of acrylic resin. Also in this embodiment, the same effect as with First Embodiment was recognized.

(Third Embodiment)

A liquid crystal display unit similar to that of First Embodiment was manufactured. As the smoothening film of a TFT substrate, however, the material represented by the formula (8) was used for that represented by the formula (2) and a solution comprising this and a heat latent catalyst of 2-oxocyclohexylmethyl (2-norbornyl) sulfonium trifluorate represented by the above formula (5) dissolved in propylene glycol monomethylether acetate was prepared. This solution was rotationally applied to the surface of the third inter-layer film on the first substrate and thermally polymerized at 150° C. or higher to form a transparent approx. 3 μm thick smoothening film made of acrylic resin. Also in this embodiment, the same effect as with First Embodiment was recognized.

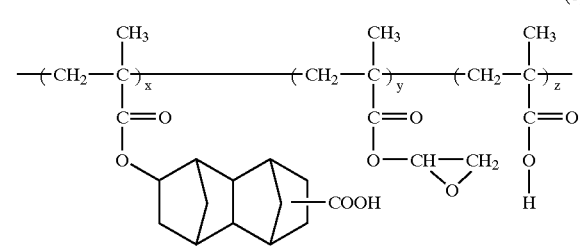

(8)

(Fourth Embodiment)

A liquid crystal display unit similar to that of First Embodiment was manufactured. As the smoothening film of a TFT substrate, however, a solution comprising the material represented by the formula (8) of Third Embodiment and a heat latent catalyst of cyclohexylmethyl(2-oxocyclohexyl) sulfonium trifluorate represented by the formula (6) dissolved in propylene glycol monomethylether acetate was prepared. This solution was rotationally applied to the surface of the third inter-layer film on the first substrate and thermally polymerized at 150° C. or higher to form a transparent approx. 3 μm thick smoothening film made of acrylic resin. Also in this embodiment, the same effect as with First Embodiment was recognized.

(Fifth Embodiment)

A liquid crystal display unit similar to that of First Embodiment was manufactured. As the smoothening film of a TFT substrate, however, a solution comprising acetoxytetracyclo $[4.4.0.1^{2,5}.1^{7,10}]$dodecylacrylate-3,4-epoxy tricyclo $[5.1.2.0^{2,6}]$decylacrylate represented by the above formula (3) and a heat latent catalyst of oxocyclohexylmethyl (2-norbornyl) sulfonium trifluorate represented by the above formula (5) dissolved in propylene glycol monomethylether acetate was prepared. This solution was rotationally applied to the surface of the third inter-layer film on the first substrate and thermally polymerized at 150° C. or higher to form a transparent approx. 3 μm thick smoothening film made of acrylic resin. Also in this embodiment, the same effect as with First Embodiment was recognized.

(Sixth Embodiment)

A liquid crystal display unit similar to that of First Embodiment was manufactured. As the smoothening film of a TFT substrate, however, a solution comprising acetoxytetracyclo $[4.4.0.1^{2\ 5}.1^{7,10}]$dodecylacrylate-3,4-epoxy tricyclo $[5.2.1.0^{2,6}]$decylacrylate represented by the above formula (3) and a heat latent catalyst of cyclohexylmethyl (2-oxocyclohexyl) sulfonium trifluorate represented by the above formula (6) dissolved in butyl acetate was prepared. This solution was rotationally applied to the surface of the third inter-layer film on the first substrate and thermally polymerized at 150° C. or higher to form a transparent approx. 3 μm thick smoothening film made of acrylic resin. Also in this embodiment, the same effect as with First Embodiment was recognized.

(Seventh Embodiment)

A liquid crystal display unit similar to that of First Embodiment was manufactured. As the smoothening film of a TFT substrate, however, a solution comprising poly (acetoxytetracyclo [$4.4.0.1^{2,5}.1^{7,10}$]dodecylacrylate-2-epoxy norbornyl acrylate) represented by the above formula (4) and a heat latent catalyst of 2-oxocyclohexylmethyl (2-norbornyl) sulfonium trifluorate represented by the above formula (5) dissolved in propylene glycol monomethylether acetate was prepared. This solution was rotationally applied to the surface of the third inter-layer film on the first substrate and thermally polymerized at 150° C. or higher to form a transparent approx. 3 μm thick smoothening film made of acrylic resin. Also in this embodiment, the same effect as with First Embodiment was recognized.

(Eighth Embodiment)

A liquid crystal display unit similar to that of First Embodiment was manufactured. As the smoothening film of a TFT substrate, however, a solution comprising poly (acetoxytetracyclo [$4.4.0.1^{2,5}.1^{7,10}$]dodecylacrylate-2-epoxy norbornyl acrylate) represented by the above formula (4) and a heat latent catalyst of cyclohexylmethyl(2-oxocyclohexyl) sulfonium trifluorate represented by the above formula (6) dissolved in propylene glycol monomethylether acetate was prepared. This solution was rotationally applied to the surface of the third inter-layer film on the first substrate and thermally polymerized at 150° C. or higher to form a transparent approx. 3 μm thick smoothening film made of acrylic resin. Also in this embodiment, the same effect as with First Embodiment was recognized.

What is claimed is:

1. A liquid crystal display unit comprising:

a TFT substrate with a thin film transistor (TFT) formed thereon;

an opposite substrate with a common electrode formed thereon; and a liquid crystal layer packed and formed between these substrates, wherein said TFT substrate comprises a first transparent substrate, and a first light shielding film, an underlying film, a TFT, a first inter-layer film, a wiring metal film, a second inter-layer insulting film, a third inter-layer insulating film, a smoothening film, a first transparent electrode film and a first alignment layer sequentially formed on the first transparent substrate, and said opposite substrate comprises a second transparent substrate, and a second transparent electrode film forming said common electrode and a second alignment layer sequentially formed on the second substrate, and said smoothening film is made of a transparent resin so as to pass light therethrough without absorbing light with a wavelength of 300 nm or higher, wherein said transparent resin is an acrylic resin, prepared from acetoxy tetracyclo [$4.4.0.1^{2,5}1^{7,10}$]dodecyl acrylate-3, 4-epoxy tricyclo[$5.2.1.0^{2,6}$]decylacrylate represented by the following formula (3)

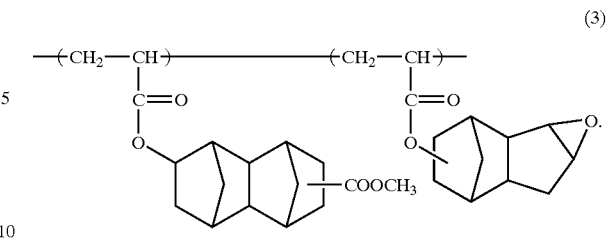

2. A liquid crystal display unit comprising:

a TFT substrate with a thin film transistor (TFT) formed thereon;

an opposite substrate with a common electrode formed thereon; and a liquid crystal layer packed and formed between these substrates, wherein said TFT substrate comprises a first transparent substrate, and a first light shielding film, an underlying film, a TFT, a first inter-layer insulating film, a wiring metal film, a second inter-layer insulting film, a third inter-layer insulting film, a smoothening film, a first transparent electrode film and a first alignment layer all sequentially formed on the first transparent substrate, and said opposite substrate comprises a second transparent substrate, a second transparent electrode forming said common electrode and a second alignment layer all sequentially formed on the second substrate, and said smoothening film is made of a transparent resin so as to pass light therethrough without absorbing light with wavelength of 300 nm or higher, wherein said transparent resin is an acrylic resin, prepared from acetoxy tetracyclo [$4.4.0.1^{2,5}1^{7,10}$]dodecyl acrylate-2-epoxy norbornyl acrylate represented by the following formula (4)

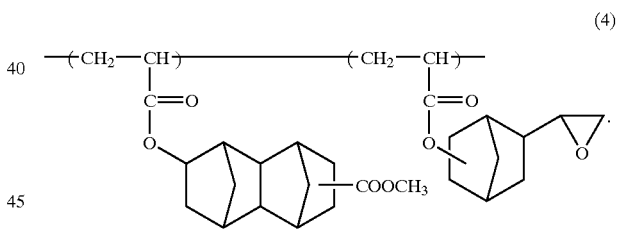

3. A liquid crystal display unit as set forth in claim 1, wherein said TFT substrate has a second light shielding film between said second inter-layer film and said third inter-layer film.

4. A liquid crystal display unit as set forth in claim 2, wherein said TFT substrate has a second light shielding film between said second inter-layer film and said third inter-layer film.

* * * * *